July 11, 1950     H. G. LEUPOLD     2,514,881
THERMOSTATIC SWITCH
Filed May 23, 1947
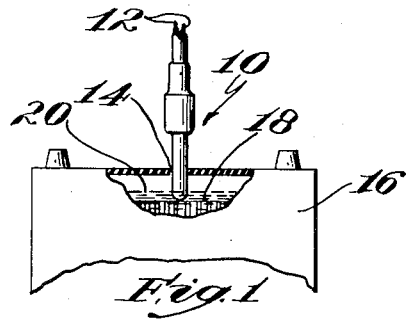
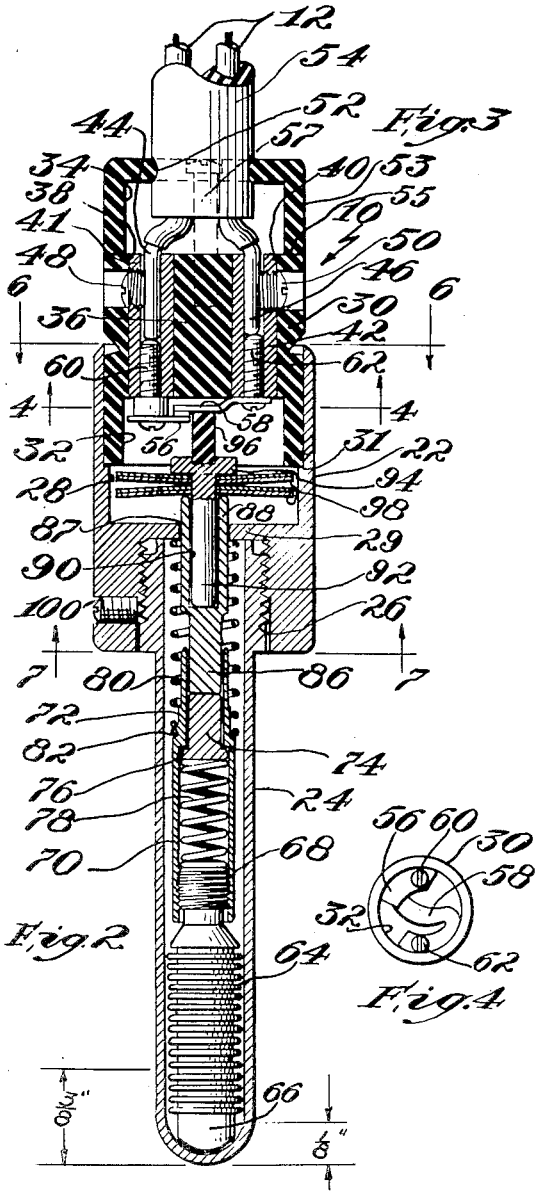
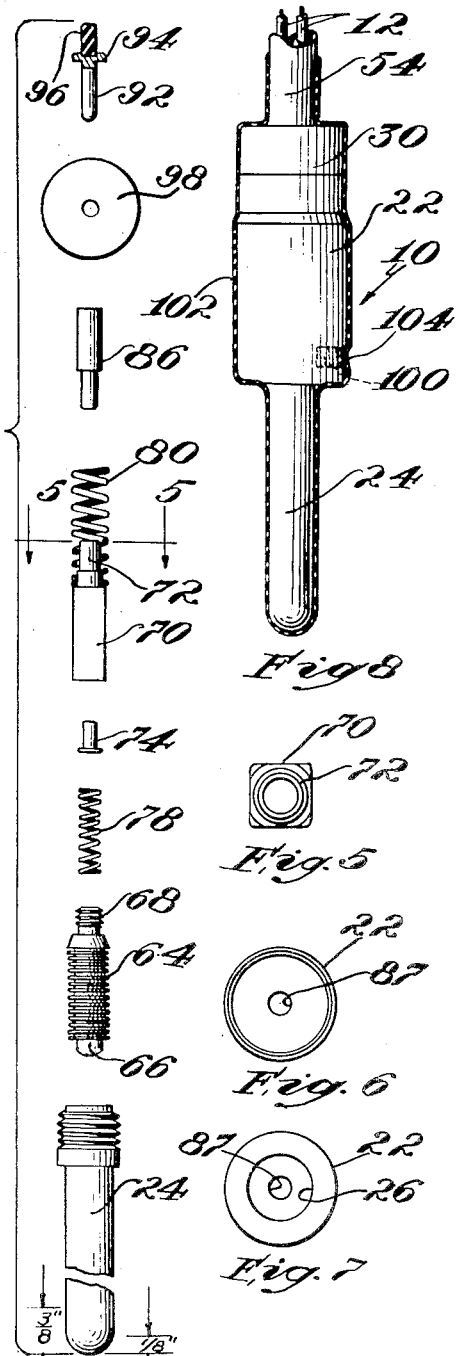
Inventor
Henry G. Leupold
by Roberts, Cushman & Grover
Atty's Patented July 11, 1950

2,514,881

UNITED STATES PATENT OFFICE 2,514,881

THERMOSTATIC SWITCH

Henry G. Leupold, Arlington, Mass., assignor to United Electric Controls Company, South Boston, Mass., a corporation of Massachusetts Application May 23, 1947, Serial No. 749,997

2 Claims. (Cl. 200—140)

This invention relates to electric switches of the temperature-responsive type and is more particularly related to switches for use in charging storage batteries.

It has been found that it is possible to charge storage batteries rapidly without damage thereto provided the electrolyte is not allowed to become too hot. To prevent undue heating it is customary to include a temperature-responsive switch in the charging circuit and to insert the switch into one of the battery cells through the filling and vent opening so that it is immersed in the electrolyte. When the electrolyte becomes too hot, a temperature-responsive element in the switch will move one of the contacts relative to the other to interrupt the charging circuit until the electrolyte cools down, whereupon it will close the circuit again and charging will continue. As thus set up the battery will be charged intermittently, the switch making and breaking the circuit in accordance with the temperature changes of the electrolyte. Due to the fact that the depth of the electrolyte above the cell plates is small, prior switches have been sluggish in response to the temperature changes of the electrolyte, and consequently the charging period has been prolonged by failure of the switch to act as soon as the liquid cooled down and vice versa and there has been a tendency for over-heating of the electrolyte because of failure of the temperature-responsive element to take up the heat of the electrolyte rapidly. Furthermore, in prior switches there has been such a large proportion of the temperature-responsive element exposed to the ambient temperature above the electrolyte that the effect of the electrolyte on the switch has been nullified or at least made inaccurate.

The objects of the present invention are to provide for an improved temperature-actuated switch which will be sensitive to small temperature changes when only slightly immersed in the electrolyte, which will be unaffected by the ambient temperature, which will be of simple construction, not subject to damage by rough usage, and which will be protected from the corrosive action of the electrolyte.

Accordingly, and as illustrated herein, the invention resides in one aspect in a temperature-actuated switch in which there are relatively movable contacts arranged normally to complete a charging circuit through a storage battery but by separation to interrupt the circuit when the electrolyte becomes too hot. As illustrated, an expansible capsule containing an expansible fluid, for example ether, is immersed in the electrolyte of the battery and is connected to one of the aforesaid contacts by way of variable length motion-transmitting means so that a rise in the temperature of the electrolyte beyond a predetermined amount will expand the capsule, thereby moving one of the contacts relative to the other to interrupt the circuit. There is interposed in the motion-transmitting means means for compensating for variations in the ambient temperature. Specifically, the compensating means comprises one or more bimetallic elements arranged to shorten the effective length of the motion-transmitting means for increases in the ambient temperature and to lengthen it for decreases in the ambient temperature.

As illustrated, the contacts are housed in a cylindrical body portion and the expansible capsule in a slender cylindrical shell portion, the latter being threaded at one end into the lower end of the body portion. As constructed, the shell portion is small enough in diameter to permit ready passage through a filling and vent opening, long enough to reach into the top edges of the plates and the capsule is located near the lower end of the shell so that it will be in close proximity to the electrolyte in which the lower end of the shell is immersed. The motion-transmitting means is housed for the most part in the shell. The upper end, however, passes through an aperture in the body portion and is held centered therein by guide means formed by the bordering edge of the aperture which is concentric with the longitudinal axis of the shell. The motion-transmitting means includes a sleeve fixed to the top of the expansible capsule, a plunger yieldably supported by a spring in the sleeve, a rod seated in the sleeve on the top of the plunger, and a spindle telescopically arranged within the hollow upper end of the rod, the spindle having a non-conductive block which is held in engagement with one of the contacts by reason of the spring-pressed plunger. A second spring surrounds the sleeve and is held compressed between a shoulder formed thereon and the marginal edge of the aforesaid aperture, thereby placing the capsule under an initial compression. By rotation of the shell relative to the body portion the position of the motion-transmitting means as a whole may be changed to cause the contacts to separate at a predetermined temperature. The body portion and shell are encased in a thin, liquid-tight sheath which should not be more than .05 inch thick at its lower end.

The invention will now be described in detail with reference to the accompanying drawings in which:

Fig. 1 shows a storage battery broken away in part to illustrate the position of the switch in use;

Fig. 2 is a vertical section through the switch greatly enlarged;

Fig. 3 is an exploded view of the component parts of the switch in the order of their occurrence in the switch;

Fig. 4 is a section taken on the line 4—4 of Fig. 2 showing the contact springs;

Fig. 5 is a section taken on the line 5—5 of Fig. 3;

Fig. 6 is a transverse section taken on the line 6—6 of Fig. 2 with the lead in plug and contacts omitted;

Fig. 7 is a section taken on the line 7—7 of Fig. 2 with the shell removed; and

Fig. 8 is an elevation of the switch encased in a liquid-tight protective sheath.

Referring to Fig. 1, there is shown a temperature actuated switch 10 which is connected into a battery charging circuit by suitable conductors 12, the switch being passed through an opening 14 such as a filling and vent opening of a storage battery 16 until its lower end is in contact with the top edges of the cell plates 18. As thus positioned, the lower end of the switch is immersed in the electrolyte 20 to a depth which amounts to between one-eighth and three-eighths of an inch.

Because of the very small depth of the electrolyte, the switch must be sensitive in order to respond accurately to temperature changes of the electrolyte which contacts but a relatively small surface area thereof, and at the same time must be free of ambient temperature changes above the electrolyte. Such ambient temperature changes may vary between —40° F. and +120° F. With such a range the metal parts of the motion-transmitting means, to be described hereinafter, would ordinarily expand and contract sufficiently to nullify the sensitivity of the switch. Accordingly, the switch, as shown in Fig. 2, is comprised of a cylindrical body portion 22 and a slender cylindrical shell portion 24. The body portion has in its lower end a threaded aperture 26 into which is threaded the upper end of the shell portion, these portions being rotatable relative to each other for a purpose which will appear hereinafter. The upper end of the body portion 22 has a central opening 28 of relatively large diameter therein, separated from the threaded aperture 26 by transverse wall 29 into which there is inserted cylindrical plug 30 composed of a non-conductive material such as a plastic, resin, hard rubber or lava. The depth of the penetration of the plug into the body portion is limited by an internal annular shoulder 31. In assembling the device the upper marginal edge of the body portion may be spun inwardly so as to provide a permanent joint between the plug and the body portion. The plug has lower and upper chambers 32 and 34 therein separated by a wall 36. Extending longitudinally through the wall 36 and in communication with the lower and upper chambers 32 and 34 are a pair of substantially, diametrically spaced passages 38 and 40 in which there are disposed sleeves 41 and 42. The bared terminal ends 44 and 46 of the conductors 12 are led into the upper ends of these sleeves and are secured therein by screws 48 and 50. The conductors 12 are encased in a cable 54 which is led into the plug at its upper end through an aperture 52. The top portion of the plug may be in the form of a cap separable therefrom along the line 55 and secured thereto by screws 57. In assembling the device the cap is slipped over the end of the cable, and, when the latter is screwed down in place, it provides an anchor for the cable and releases the strain on the secured ends of the bared terminals. Within the chamber 32 at the lower end of the plug there are positioned a pair of spring contacts 56 and 58, the contacts being electrically connected to the bared terminal ends of the conductors 44 and 46 by means of screws 60 and 62.

Within the slender shell portion 24 near the lower end thereof there is positioned an expansible capsule in the form of a conventional bellows composed of a thin metal, such as brass or copper, filled with the expansible fluid such as ether under a pressure of approximately twelve pounds per square inch so that it will remain liquid under normal operating conditions. Ether under such a pressure will expand very rapidly for small changes in temperature. As illustrated the capsule occupies approximately the lower one-third of the shell and at least approximately the lower third of the capsule should be within the lower three-eighths of an inch of the bottom of the shell, and at its lower end the capsule is reduced in diameter at 66 and its end rounded so as to fit closely into the inside rounded lower end of the shell. This portion is not corrugated, is thin enough to provide for rapid absorption and transmission of small temperature changes to the fluid within the capsule and is confined to approximately the lowermost one-eighth inch of the bottom of the shell. In use, as illustrated in Fig. 1, the shell extends into the battery into contact with the top edges of the plates and when so situated approximately not less than the lower one-third of the shell is confined within the battery case between its cover and the top of the plates, depending of course to some extent upon the battery design or to whether more than one-third extends into the battery, and hence takes the temperature of the battery, whereas the remainder, that is the exposed part, of the shell will take the temperature of the ambient atmosphere.

The upper end of the expansible capsule is threaded at 68, and there is secured thereto a sleeve 70 which has a rectangular cross-section. The sleeve has a reduced neck 72 near the upper end thereof and a headed plunger 74 is disposed within the sleeve and is held therein by engagement of its head with an internal shoulder 76 by means of a compression spring 78. A second spring 80 surrounds the neck 72 of the sleeve 70 and is seated at one end against an annular shoulder 82 of the sleeve and at the other end against the wall 29. This spring serves two purposes, first, it hastens the collapse of the bellows upon a lowering of the temperature, and, second, it yieldably opposes destructive expansion of the motion-transmitting means by unforeseen temperature rises after the circuit is interrupted. Seated in the upper end of the sleeve 70 and resting on the plunger 74 there is a rod 86 which passes upwardly through an aperture 87 formed in the wall 29 concentric with the axis of the shell portion into the opening 28 formed in the body portion. The upper end of the rod 86 has an axial bore 90 therein in which there is telescopically arranged a spindle 92 having at its upper end a head 94. Fixed to the head is a non-conductive block 96, the upper end of which is in engagement with the contact 58. It is evident that the component parts of the aforesaid motion-transmitting means are substantially floating, that is, having a minimum of contact with the body and the shell portions which house them, and hence there is a minimum of friction between the parts to spoil their sensitivity to movement. The only guiding means is afforded by the passage of the stem 86 through the aperture 87.

As thus constructed, the temperature at which the contacts will separate to interrupt the charging circuit may be selected by adjustment of the shell portion relative to the body portion, this being effected by rotation of the shell portion relative to the body portion to change the relative position of the motion-transmitting means as a whole and hence the amount the capsule 64 has to expand or contract to act on switch contact 58. Normally the maximum temperature of the electrolyte should not exceed 130° F. When the adjustment has been effected, the parts may be fixed in their adjusted position by setting the screw 100 which is threaded into the body portion against the threaded upper end of the shell portion.

In charging a battery, the temperature usually rises to the maximum 130° F. limit before the battery is completely charged, and hence the switch will operate to interrupt the charging until the electrolyte cools down. This results in intermittent or cyclic charging of the battery, and if the temperature-responsive means is insensitive or if ambient temperature changes render it ineffective, there may be a considerable lag between the time the electrolyte has cooled down sufficiently to permit re-continuing the charging and the response of the switch to the temperature to effect movement of the contacts to reestablish the charging circuit. In fact there might be sufficient elongation or contraction of the motion-transmitting means, due to the ambient temperature, to hold the contacts out of engagement so that no charging would take place, or sufficient contraction so that the contacts would not be separated and the battery would be heated beyond the danger point. Hence, there is provided means for compensating for the ambient temperature above the electrolyte so that the motion-transmitting means will be unaffected in length by the ambient temperature. To this end there is disposed on the spindle 92 between the head 94 and the upper end of the stem 86 two pairs of bimetallic elements in the form of discs 98 so arranged that an increase in the ambient temperature will cause them to become concave toward each other, thereby to shorten the effective length of the component parts of the motion-transmitting means, and a decrease in temperature will cause them to become convex toward each other, thereby to increase the effective length of the motion-transmitting means. While the pairs of bimetallic elements are illustrated herein, it is to be understood that a greater or lesser number may be used, depending upon the conditions encountered and the results desired. By thus compensating for the ambient temperature, temperature differentials of the electrolyte of five degrees and less will actuate the switch. This improves the charging rate as it eliminates undue lag and therefore shortens the charging period. It would not be desirable to render the lag in the switch too short, however, as the switch would become inoperative since if the switch were too sensitive the contacts would close at substantially the same temperature at which they would be caused to open, and hence the electrolyte would not have sufficient time to cool.

After the adjustment of the device for the predetermined upper temperature limit, the whole unit is dipped into a solution of Coroseal, rubber or synthetic resinous material to form a thin, protective sheath 102, impervious to the electrolyte (Fig. 8), over the entire unit including the lead-in cable 54, the coating thereafter being cured to form a jointless jacket. The thickness of this sheath or jacket at the lower end of the shell portion should not be more than .05 inch, although at other points it may be thicker. If adjustments of the device to effect separation of the contacts at different temperatures are desired after the protective sheath 102 is formed, the screw 100 may readily be located by reason of the slightly concave depression 104 in the sheath above the screw opening (Fig. 8), and an aperture may be formed therein so that the screw may be backed off by means of a screw driver. The shell portion may then be rotated relative to the body portion the desired amount and the screw set into place again. After such an adjustment has been made, the aperture in the sheath may easily be mended by applying thereto a rubber composition of a self-curing nature.

In operation the device is interposed in a charging circuit of a storage battery and is then inserted into the battery cell through a filling and vent opening, as is shown in Fig. 1. After the current has been established in the circuit as the temperature rises in the battery, the bellows will begin to expand and cause the motion-transmitting means to act upon the contacts at the upper predetermined temperature for which the switch is set to interrupt the circuit. As soon as this occurs, the temperature of the electrolyte begins to drop in the battery, whereupon the contacts are moved relative to each other to reestablish the circuit. This continues intermittently until the battery is fully charged. The switch is provided with standard electrical clearances so that it is capable of handling current from 110 to 220 volts at 500 watts.

It should be understood that the present disclosure is for the purpose of illustration only and that this invention includes all modifications and equivalents which fall within the scope of the appended claims.

I claim:

1. In a thermic switch for use in rapidly charging storage batteries a body portion, a shell portion threaded thereinto, said shell portion being of such diameter as readily to pass through the filling and vent plug opening of the battery, a pair of contacts in the body portion, an expansible capsule close to the lower end of the shell having an expansible fluid therein, a sleeve within the shell threaded to the upper end of the capsule, a spring-pressed plunger within the sleeve, a rod resting on the plunger, the upper end of which is hollow, a spindle seated in the hollow upper end of the rod, the upper end of the spindle having insulator means surmounted thereon for engagement with one of the contacts, and a bimetallic member interposed between the top of the rod and a shouldered portion of the spindle to vary the effective length of the spindle.

2. In a thermic switch for use in rapidly charging storage batteries a body portion, a shell portion threaded thereinto, said shell portion being of such diameter as readily to pass through the filling and vent opening of a battery and having a hemispherical lower end, said switch being operable when the shell is submerged by as little as ⅛ of an inch, a pair of contact points in the body portion, an expansible capsule in the lower end of the shell with at least ¼ of its length within the lower ⅜ of an inch of the bottom of the shell being filled with an expansible fluid, variable length motion-transmitting means between the capsule and one of the contacts for moving one of the contacts relative to the other upon expansion of the capsule, means interposed in the motion-transmitting means to compensate for variation in the ambient temperature, and means for adjusting the initial length of the motion-transmitting means to cause interruption of the circuit at a predetermined temperature.

HENRY G. LEUPOLD.

REFERENCES CITED

The following references are of record in the file of this patent:

UNITED STATES PATENTS

| Number | Name | Date |
|---|---|---|
| 1,894,842 | Appelberg | Jan. 17, 1933 |
| 1,927,934 | Ford | Sept. 26, 1933 |
| 1,932,988 | Raney | Oct. 31, 1933 |
| 2,181,809 | Grayson | Nov. 28, 1939 |
| 2,197,230 | Waddell | Apr. 16, 1940 |
| 2,376,056 | Heyer | May 15, 1945 |
| 2,390,145 | Graves | Dec. 4, 1945 |
| 2,395,007 | Leupold | Feb. 19, 1946 |
| 2,440,943 | Gonsett et al. | May 4, 1948 |